April 30, 1935. J. A. DES ROSIERS 1,999,962
LIQUID HEATER
Filed Dec. 12, 1933 2 Sheets-Sheet 1
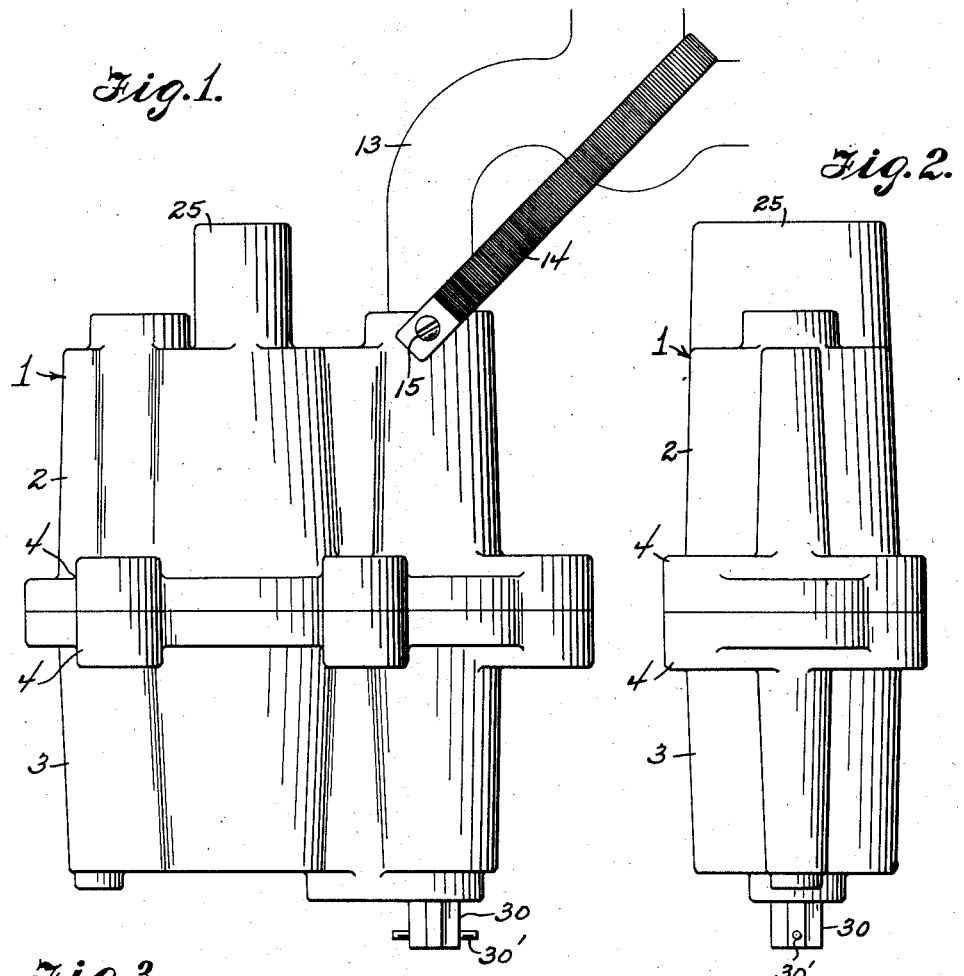
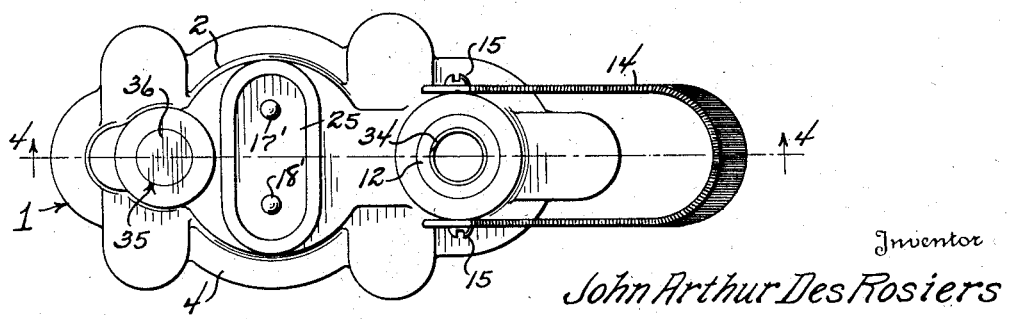
Inventor
John Arthur Des Rosiers
By [signature]
Attorney April 30, 1935.  J. A. DES ROSIERS  1,999,962
LIQUID HEATER
Filed Dec. 12, 1933   2 Sheets-Sheet 2
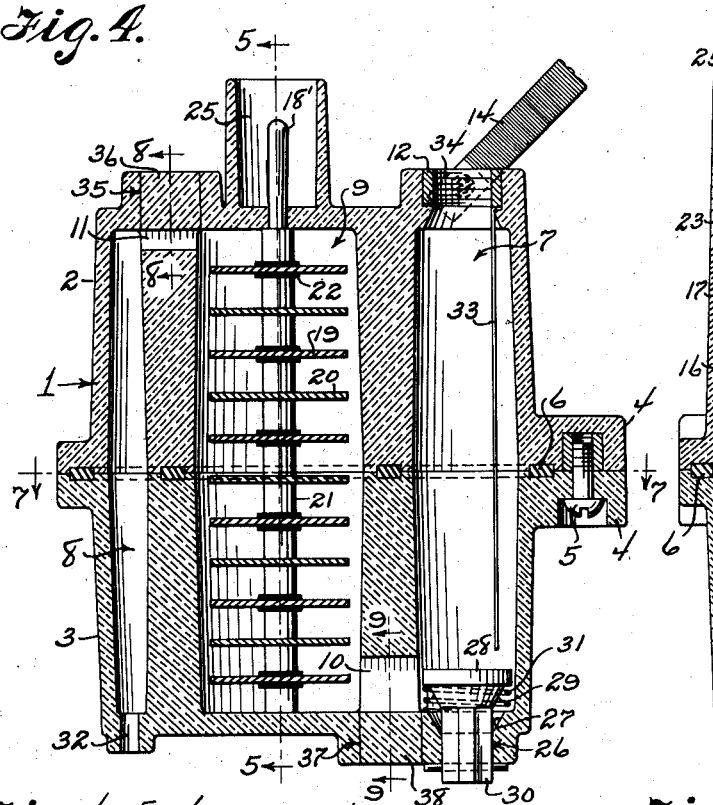
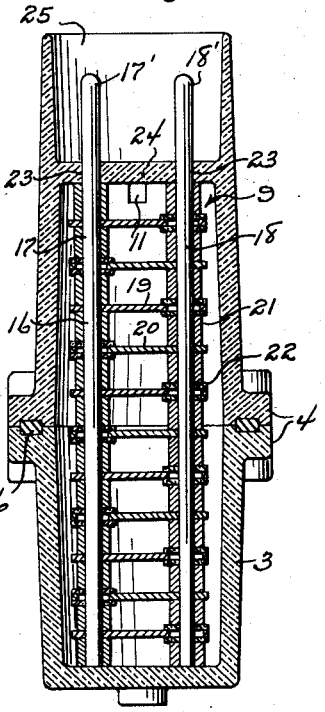
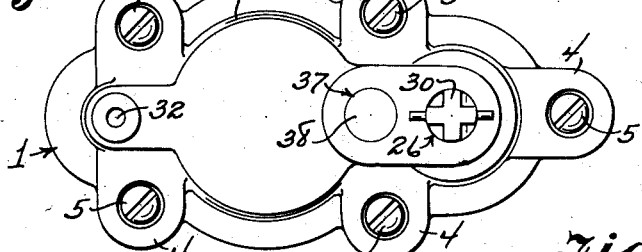
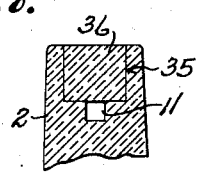
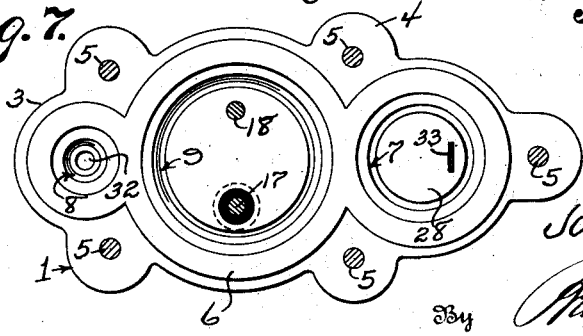
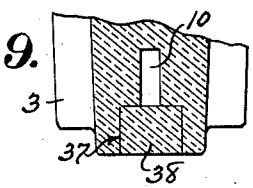
Inventor
John Arthur Des Rosiers
By
Attorney Patented Apr. 30, 1935

1,999,962

UNITED STATES PATENT OFFICE 1,999,962

LIQUID HEATER

John Arthur Des Rosiers, Morrisburg, Ontario, Canada

Application December 12, 1933, Serial No. 702,057

14 Claims. (Cl. 219—40)

This invention relates to liquid heaters of that type designed to be attached to water or other liquid supply faucets or conductors and which are provided with internal heating units whereby the liquid flowing through the heater is heated to a desired degree before discharge.

The main object of the invention is to provide a heater especially adapted for attachment to a water faucet and containing an electrical heating unit for heating the water, which heater embodies a novel construction of casing and construction and arrangement of working parts therein, whereby a simple, safe, reliable, economical and efficient heater is produced.

A further object of the invention is to provide a heater of the character described in which special provision is made to respectively close and open a drain or vent passage when the water is let on and cut off so as to drain the heater of any residual water to avoid generation of steam and liability of an explosion.

A still further object is to provide a construction whereby the flow of electric current for the heating action is cut on in the presence of water and cut off in the absence of water.

The invention consists of the features of construction, combination and arrangement of parts, hereinafter fully described and claimed, reference being had to the accompanying drawings, in which:—

Fig. 1 is a side view of an electrical heater embodying my invention, showing it attached to a water faucet.

Fig. 2 is a front elevation of the same.

Fig. 3 is a top plan view of the heater.

Fig. 4 is a central, vertical front-to-rear section therethrough taken on line 4—4 of Fig. 3.

Fig. 5 is a vertical transverse section on line 5—5 of Fig. 4.

Fig. 6 is a bottom plan view of the heater.

Fig. 7 is a sectional plan view on line 7—7 of Fig. 6.

Figs. 8 and 9 are detail sections on lines 8—8 and 9—9 of Fig. 4.

In carrying my invention into practice I provide an electrical water or other liquid heater comprising a casing 1, molded from any suitable strong and durable insulating material, and which is divided along a horizontal transverse line or composed of top and bottom sections 2 and 3 provided at their meeting edges with opposed flanges 4 for the reception of screws or other suitable fastening elements 5, whereby said casing sections are securely but detachably united. The inner faces of the flanges 4 may be suitably grooved or recessed to form seats for a packing gasket 6 or other sealing element or medium to make the joint between the sections proof against the escape of liquid.

The casing sections are provided with cooperating cavities to form a liquid inlet chamber 7, a liquid discharge chamber 8 and a liquid heating chamber 9, the last-named chamber being preferably disposed between the first two named. The chamber 7 is in communication at its lower end with the lower end of the chamber 9 through a connecting port or passage 10, while the chamber 9 is in communication at its upper end with the upper end of the chamber 8 through a connecting port or passage 11, whereby liquid from the chamber 7 may flow into the bottom of the chamber 9 for a heating action therein and discharge from the chamber 9 through port 11 into the chamber 8 after being heated to the desired degree.

The chamber 7 is formed at its upper end with a water inlet connection 12 to receive the discharge outlet portion of a water supply device, such as a faucet 13, to which the heater may be secured by a metallic band or other suitable fastener 14, which band is looped about the faucet and secured at its ends to the part 12 of the heater casing by screws or other suitable fastenings 15.

Disposed within the heating chamber 9 is an electrical heating unit 16 of a type designed to rapidly heat the water or other liquid and at the same time to be readily applicable to the casing in assembling the parts of the heater and as readily disassembled from the casing for cleaning, repairs or other purposes when necessary. This heater comprises a pair of conductor rods 17 and 18 which are coupled by sets of alternately arranged resistance elements 19 and 20, of opposite polarity, which are held in spaced relation and electrically separated from each other by sleeves or thimbles 21 of non-conducting material embracing the rods, and which, upon the connection of the conductor rods with the terminals of a current supply circuit, provide for a flow of current through the unit and the development of heat of a determined temperature for heating the water or other liquid to a desired degree during a predetermined period of time. Each of these elements is in electrical engagement with one of the rods and insulated by insulators 22 from the other rod, the elements 20 being in electrical connection with the rod 17 and insulated by insulators 22 from the rod 18, while the resistance elements 20 are, on the other hand, electrically engaged with the rod 18 and insulated by insulators 22 from the rod 17. The resistance elements 19 and 20 may be conductors of a sort which will coact with the water or other liquid, serving as the resistance medium, whereby a heating action of the water or liquid is effected in the flow of the current from rod to rod and plate to plate of the series throughout the heating unit.

The heating unit, as shown, rests at its lower end or is supported by contact with the base or floor of the chamber 9, and the upper end of the unit is connected with the casing and held centered in the chamber 9 by the upper extended ends 17' and 18' of the rods which project upwardly through openings 23 in the top wall 24 of the chamber 9 into a socket or receptacle 25 formed unitarily with said wall 24 of the same insulating material as the casing. The rod extensions 17', 18' serve as the terminals of the heating unit which are adapted to be engaged by a connector plug of proper type fitted within the socket 25 and attached to line wires leading from the conductors of a suitable source of current supply or commercial line circuit. Thus it will be understood that upon operating a switch associated with the plug, or in the conductors attached thereto, or arranged at a suitable point in the line circuit, current may be let on for supply to the heating unit for heating the water or liquid and cut off whenever a further heating action is not desired. It will be seen that the structure of the heating unit is such that when the casing sections 2 and 3 are disconnected and the casing section 3 moved downward to separate it from the section 2 the heating unit may be withdrawn with it, in which operation the terminals 17' and 18' slip downwardly and out of their receiving openings 23, whereby the heating unit may at any time be easily and conveniently removed from the casing for cleaning, repairs or other purposes. The unit may be as easily applied by sliding it upwardly into position before the casing section 3 is attached to the casing section 2, or during the application of the former to the latter.

A drain or vent port 26 is provided at the bottom of the casing which communicates with the lower end of the chamber 7 and which is provided at its upper portion with a beveled valve seat 27. This port 26 is controlled by a relief or vent valve 28 having on its underside a conical seat face 29 to engage the seat 27 and having a depending winged stem 30 to fit within the port 26 and provide flow passages for the discharge of liquid when the valve is unseated or in open position. A pin or key 30' limits the upward movement of the valve. The valve is normally held in open position by means of a coiled spring 31 and is adapted to be forced to closed position and held in such position by the weight of the water flowing into the chamber 7 and as long as such water flow action continues, so that the water or other liquid may flow uninterruptedly and without leakage through the port 26 to the heating chamber 9 through the port 10 for a heating action therein and the passage of the water from the top of the chamber 9 through the port 11 into the discharge chamber and finally out through a discharge nozzle or port 32 at the lower end of said discharge chamber. When, however, the flow of water is cut off and the valve 28 is no longer held closed by pressure thereon of water in the chamber 7 sufficient to hold it closed against the pressure of the spring 31, the spring operates to lift the valve to open position to permit any residual water remaining either in the chamber 7 or the chamber 9 to flow out. By this means the said chambers will be automatically drained at the close of each heating action to prevent the retention therein of liquid or clogging deposits therefrom, and to prevent also the generation from any continued heat of steam to a degree liable to cause explosion of the device or undesirable jetting of hot water through the outlet 32. After the supply of current to the heating unit is cut off at the close of a normal heating action, the residual water in the chamber 9 will tend to cool down the heating unit as it drains outward, but, in the event that the current should not be turned off, the drainage of the water from the heater will prevent any liability of an explosion due to generation of steam therein.

In practice it will be understood that under all normal conditions the flow of current will be from the line through one of the conductor rods and back to the line through the other conductor rods, so that a normal current flow and grounding action is ensured. In order to secure maximum safety, however, and to provide a supplemental ground for the discharge of any residual current I dispose within the chamber 7 a conductor strip or rod 33 which hangs pendent in said chamber and is electrically connected with the faucet through the attaching element 14. In the present instance this is shown as being effected by the provision within the inlet connection 12 of a bushing 34 of a suitable conducting metal which may serve as a support for the rod 33 and which is electrically connected with either or both of the fastening screws 15 of the attachment 14, whereby any current contained in the liquid and seeking a discharge may be grounded through the rod 33 and attachment 14, as will be readily understood.

While a switch of either manual or automatic type may be employed to let on the current when the flow of water is let on and to cut off the current when the flow of water is cut off, the use of such a switch, except as a main cut off, is unnecessary, as in any liquid heater the water acts as the conductor between the elements 17 and 18. Thus, assuming that rods 17 and 18 are connected to a source of current no current will flow between them except and unless they are electrically connected by water present in chamber 9. When, therefore, water is flowing and valve 28 is closed, the water flowing in chamber 9 will act as a switch to cause the flow of current. On the other hand when the flow of water is cut off the valve 28 will open to allow the residual water to drain out and the discharging water will act as a switch to cut off the flow of current. The valve 28 in this connection incidentally serves, in addition to its automatic drain feature, as a switch element in the current cut off action.

As previously described, the parts of the casing may be molded of a suitable heat proof glass or porcelain, hard rubber, or any of the insulating materials capable of being used for the purpose. To facilitate this molding action and to provide properly for the removal of cores, the casing section is provided with a core discharge opening 35 communicating with the upper ends of the chambers 8 and 9 and the channel 11 at their point of intersection, which opening 35 is sealed after formation of the casing by a plug 36, while the casing section 2 is similarly provided at the point of intersection of the lower ends of the chambers 7 and 9 and the passage 10 with a core discharge opening 37 closed after formation of the casing by a plug 38.

From the foregoing description, taken in connection with the drawings, it will be seen that the invention provides an electrical heater for attachment to a faucet or other source of supply of water or other liquid, which is not only simple of construction and reliable and efficient in action, but which is composed of a comparatively small number of parts united in such a way as to facilitate their assemblage for use and disassemblage for cleaning, inspection or repairs. Also it will be seen that the invention provides a heating device of this character which may be manufactured and sold at a comparatively low cost and which ensures safety against explosion, electrical shocks, or other annoying or dangerous mishaps. It will, of course, be understood that a suitable sealing gasket may be provided upon the faucet or in the connection 12 to prevent leakage of water at this point if and when occasion requires, and that the heater may be attached to the faucet or other supply element by any suitable means other than the attachment element 14 herein disclosed. It will furthermore be understood that while the construction shown is preferred, changes in the form, construction and arrangement of parts within the scope of the appended claims may be made without departing from the spirit or sacrificing any of the advantages of the invention.

What I claim is:—

1. In a liquid heater for attachment to a faucet or other source of liquid supply, a heater having heating means therein, and provided with a liquid inlet, a liquid outlet and a drain passage, and a spring opened valve controlling the drain passage and against the resistance of its opening means under the liquid pressure to close said passage when liquid from the source of supply is turned on and operated by its opening means to open the passage when the liquid from the source of supply is turned off.

2. In a liquid heater for attachment to a faucet or other source of liquid supply, a heater having heating means therein, and provided with a liquid inlet, a liquid outlet and a drain passage, a valve controlling said passage and operating under the force of the liquid pressure to close the passage under liquid pressure as long as liquid is flowing through the inlet, and means for closing said valve on the removal of liquid pressure therefrom.

3. In a liquid heater for attachment to a faucet or other source of liquid supply, a heater having heating means therein, and provided with a liquid inlet, a liquid outlet and a drain passage, a valve controlling said passage and operating under liquid pressure to close the passage under liquid pressure as long as liquid is flowing through the inlet, and a spring for closing said valve on the removal of liquid pressure therefrom.

4. In a liquid heater for attachment to a faucet or other source of liquid supply, a casing formed of insulating material and comprising detachably connected top and bottom sections having co-operating cavities forming an inlet chamber, an outlet chamber and an intervening heating chamber respectively connected at its lower and upper ends with the inlet and outlet chambers, the top section of the casing being provided with a plug receiving socket separated from the heating chamber by a division wall having openings therein, and an electrical heating unit in said heating chamber comprising conductor rods of opposed polarity resting on the bottom wall of the heating chamber and a series of superposed conductor plates of opposing polarity spaced from and arranged in alternation with each other and conductively connected with the respective rods, the said rods having extensions at their upper ends slidably projecting through the openings in said division wall into the socket for connection with a current supply plug fitted therein and adapted to be freely withdrawn from the socket, whereby upon the detachment of connecting means between the casing sections the heating unit may be disengaged with the bottom casing section from the top casing section.

5. In a liquid heater for attachment to a faucet or other source of liquid supply, a casing formed of insulating material and comprising detachably connected top and bottom sections substantially coextensive in size and separable substantially along a line coincident with the horizontal transverse center line of the casing and having co-operating cavities forming an inlet chamber, an outlet chamber and an intermediate heating chamber respectively extending to substantially equal degrees in the casing sections and connected at its lower and upper ends with the inlet and outlet chambers, the top section of the casing being provided with a plug receiving socket separated from the heating chamber by a division wall having openings therein, and an electrical heating unit in said heating chamber comprising conductor rods of opposed polarity resting on the bottom wall of the heating chamber and a series of superposed conductor plates of opposing polarity spaced from and arranged in alternation with each other and conductively connected with the respective rods, the said rods having extensions at their upper ends slidably projecting through the openings in said division wall into the socket for connection with a current supply plug fitted therein and adapted to be freely withdrawn from the socket, whereby upon the detachment of connecting means between the casing sections the heating unit may be disengaged with the bottom casing section from the top casing section.

6. In a liquid heater for attachment to a faucet or other source of liquid supply, a casing formed of insulating material and comprising detachably connected top and bottom sections having cooperating cavities forming an inlet chamber, an outlet chamber and an intermediate heating chamber respectively connected at its lower and upper ends with the inlet and outlet chambers, the top section of the casing being provided with a plug receiving socket separated from the heating chamber by a division wall having openings therein, the inlet chamber having a liquid inlet at its upper end and a waste outlet at its upper end and the outlet chamber having an outlet at its lower end, a spring opened waste valve controlling said waste outlet and normally held open by its spring and adapted to be forced to closed position under the pressure of liquid in the inlet chamber, and an electrical heating unit in said heating chamber comprising conductor rods of opposed polarity resting on the bottom wall of the heating chamber and a series of superposed conductor plates of opposing polarity spaced from and arranged in alternation with each other and conductively connected with the respective rods, the said rods having extensions at their upper ends slidably projecting through the openings in said division wall into the socket for connection with a current supply plug fitted therein and adapted to be freely withdrawn from the socket, whereby upon the detachment of connecting means between the casing sections the heating unit may be disengaged with the bottom casing section from the top casing section.

7. In a liquid heater for attachment to a faucet or other source of liquid supply, a heater comprising a casing having liquid inlet, discharge and heating chambers, the latter being disposed between and communicating at its bottom and top respectively with the inlet and discharge chambers, and a valve controlled drain outlet at the bottom of the inlet chamber opened by liquid pressure when liquid is flowing into said chamber and closed when the flow of liquid is cut off.

8. In a liquid heater for attachment to a faucet or other source of liquid supply, a heater comprising a casing having liquid inlet, discharge and heating chambers, the latter being disposed between and communicating at its bottom and top respectively with the inlet and discharge chambers, and a spring closed valve controlled drain outlet at the bottom of the inlet chamber opened by liquid pressure when liquid is flowing into said chamber and closed when the flow of liquid is cut off.

9. In a liquid heater for attachment to a faucet or other source of liquid supply, a heater comprising a casing formed of upper and lower detachably connected sections of insulating material divided on a substantially medial horizontal transverse line, said casing having liquid inlet, discharge and heating chambers extending substantially to equal degrees in the casing sections, the said heating chamber being disposed between and communicating at its bottom and top respectively with the inlet and discharge chambers, and electrical heating means in the heating chamber.

10. In a liquid heater for attachment to a faucet or other source of liquid supply, a heater comprising a casing of insulating material divided on a substantially medial horizontal transverse line to provide upper and lower detachably connected sections of said casing having liquid inlet, discharge and heating chambers extending substantially to equal degrees in said sections, the said heating chamber being disposed between and communicating at its bottom and top respectively with the inlet and discharge chambers, electrical heating means in the heating chamber, and a valve controlled drain outlet at the bottom of the inlet chamber opened by the force of flowing liquid when liquid is flowing into said chamber and closed when the flow of liquid is cut off.

11. In a liquid heater for attachment to a faucet or other source of liquid supply, a casing having inlet and discharge connections and a heating chamber, a ground conductor disposed in said inlet, and a conducting means including a pivotally mounted member forming a fastener for connecting said ground conductor with the faucet.

12. In a liquid heater for attachment to a faucet or other source of liquid supply, a casing molded from insulating material and divided on a substantially medial line to provide detachably connected upper and lower sections, and an electrical heating unit in said casing slidably engaged with the upper casing section and normally resting on and supported by the lower casing section and freely withdrawable from engagement with the upper casing section when the lower casing section is detached.

13. In a liquid heater for attachment to a faucet or other source of liquid supply, a receptacle having a water heating chamber water inflow and discharge connections communicating respectively with said chamber at the top and bottom thereof, and heating means in said chamber comprising spaced conductor rods adapted for connection, and sets of horizontal spaced conductor plates of opposite polarity extending between said rods and alternating in arrangement with each other, one set of plates being conductively connected with one of the rods and the other set of plates being conductively connected with the other rod.

14. In a liquid heater for attachment to a faucet or other source of liquid supply, a receptacle having water inlet and discharge connections and a waste outlet, a heating unit in said receptacle comprising conductors adapted to be respectively coupled to opposite sides of a current supply circuit and to be operatively connected for a heating action by the water to be heated when and on the presence of water in the receptacle and to be operably disconnected in the absence of water, and a drain valve for closing the drain outlet under pressure of the water when water is being supplied to the heater and to open the drain outlet for discharge of water when such pressure is moved by the supply of water being cut off.

JOHN ARTHUR DES ROSIERS.